Feb. 21, 1961 J. BARTON 2,972,403
WORK HANDLING MACHINE WITH SKIP MECHANISM
Filed May 15, 1959 4 Sheets-Sheet 3
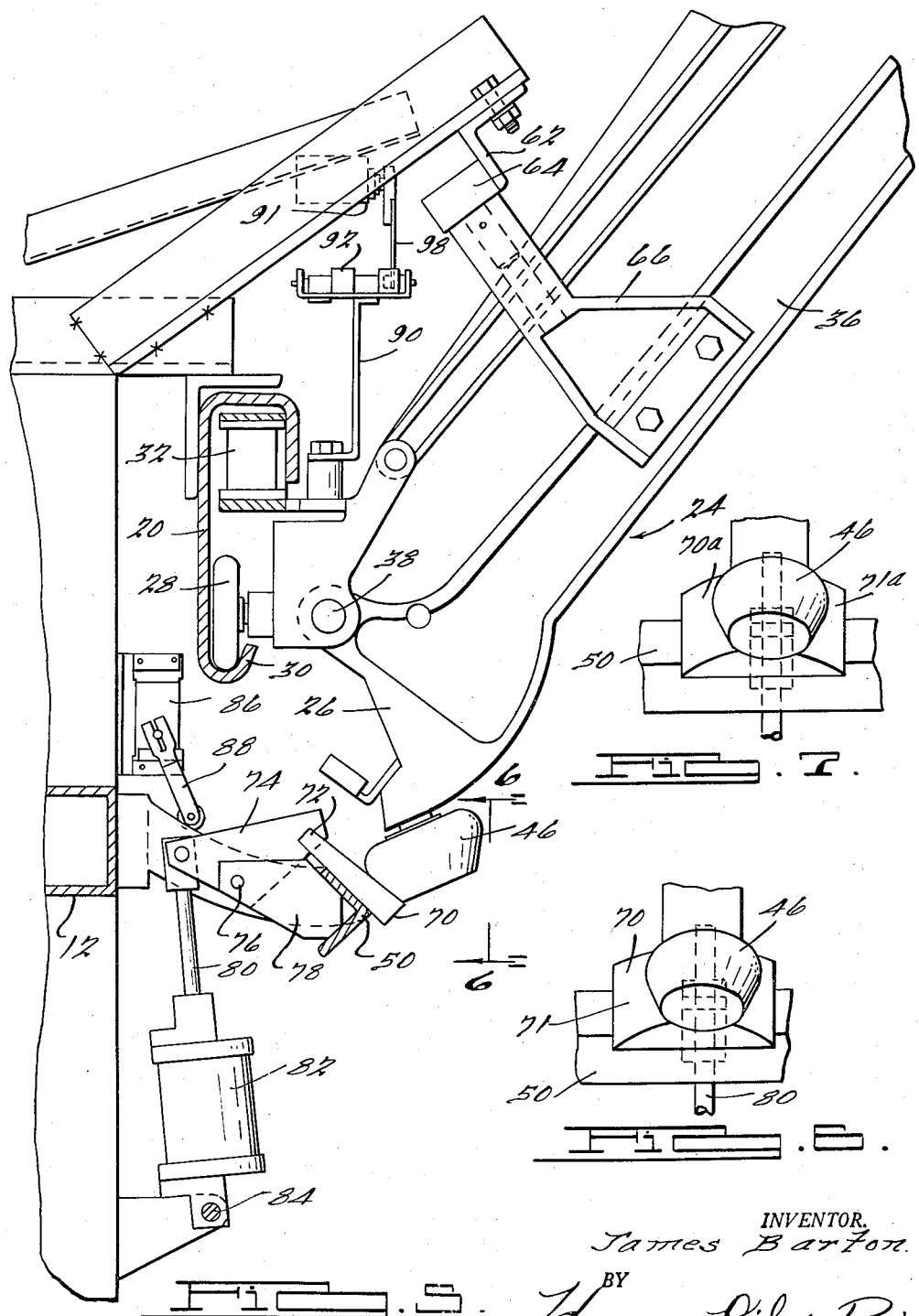
INVENTOR.
James Barton.
BY
Harness, Dickey & Pierce
ATTORNEYS.

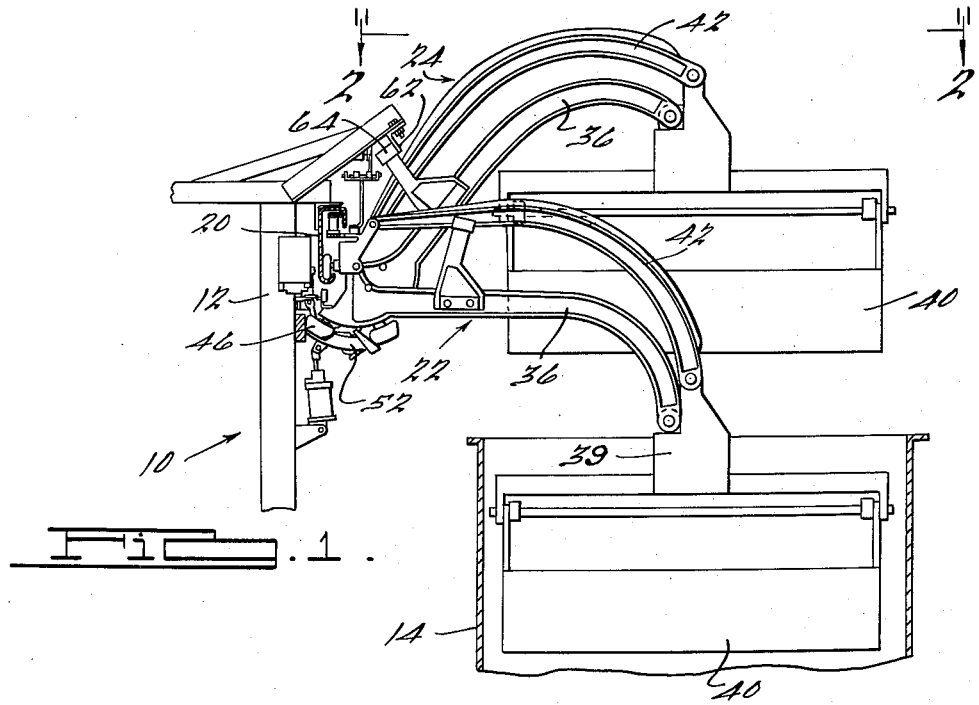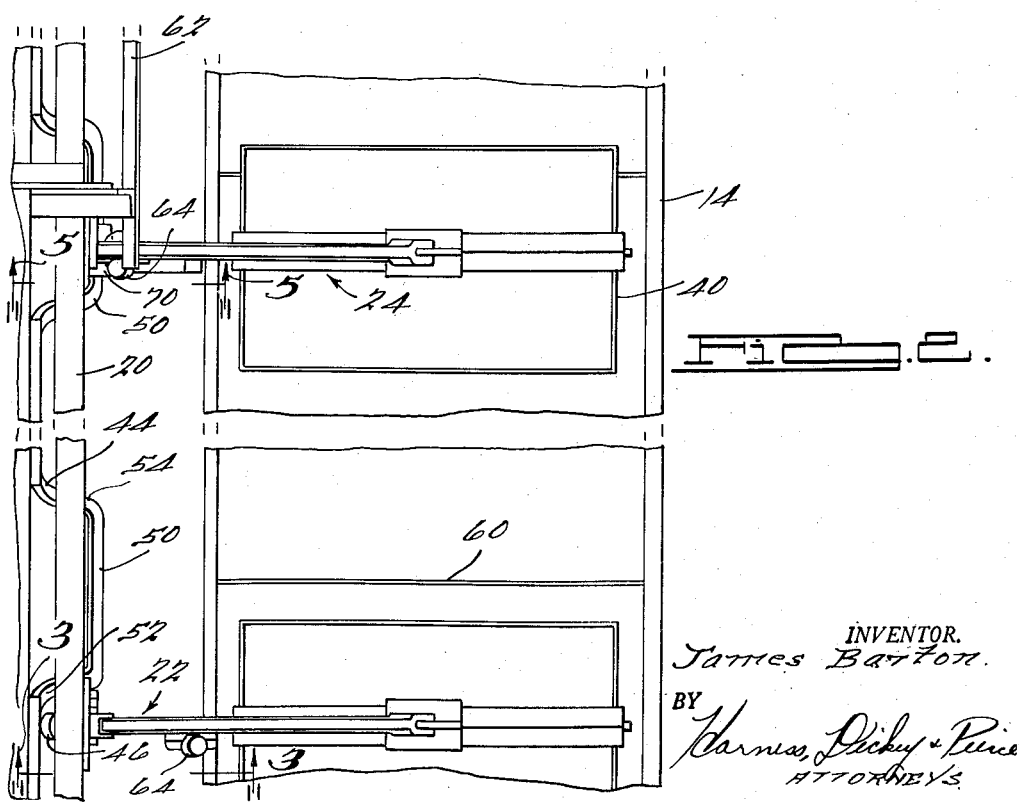

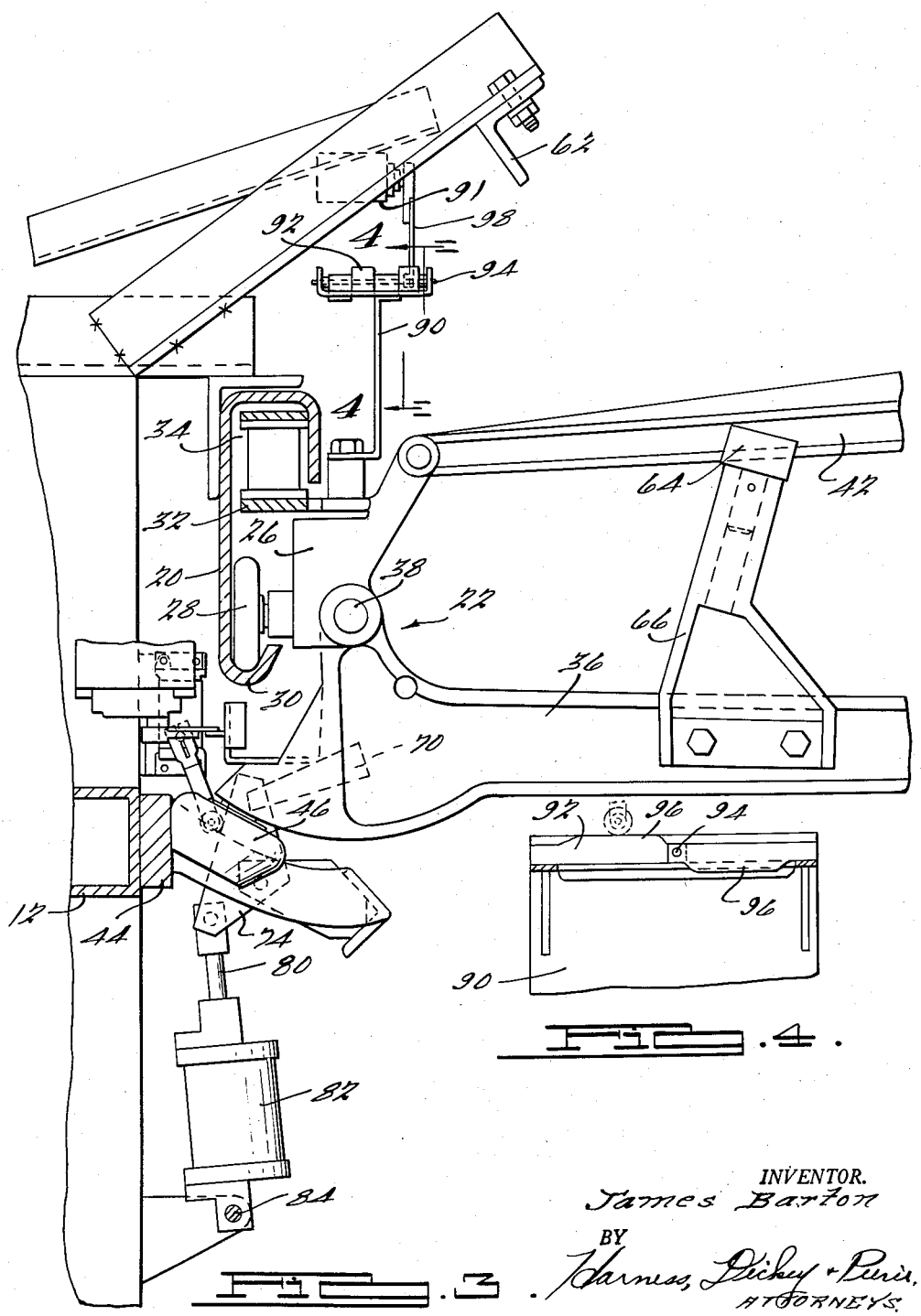

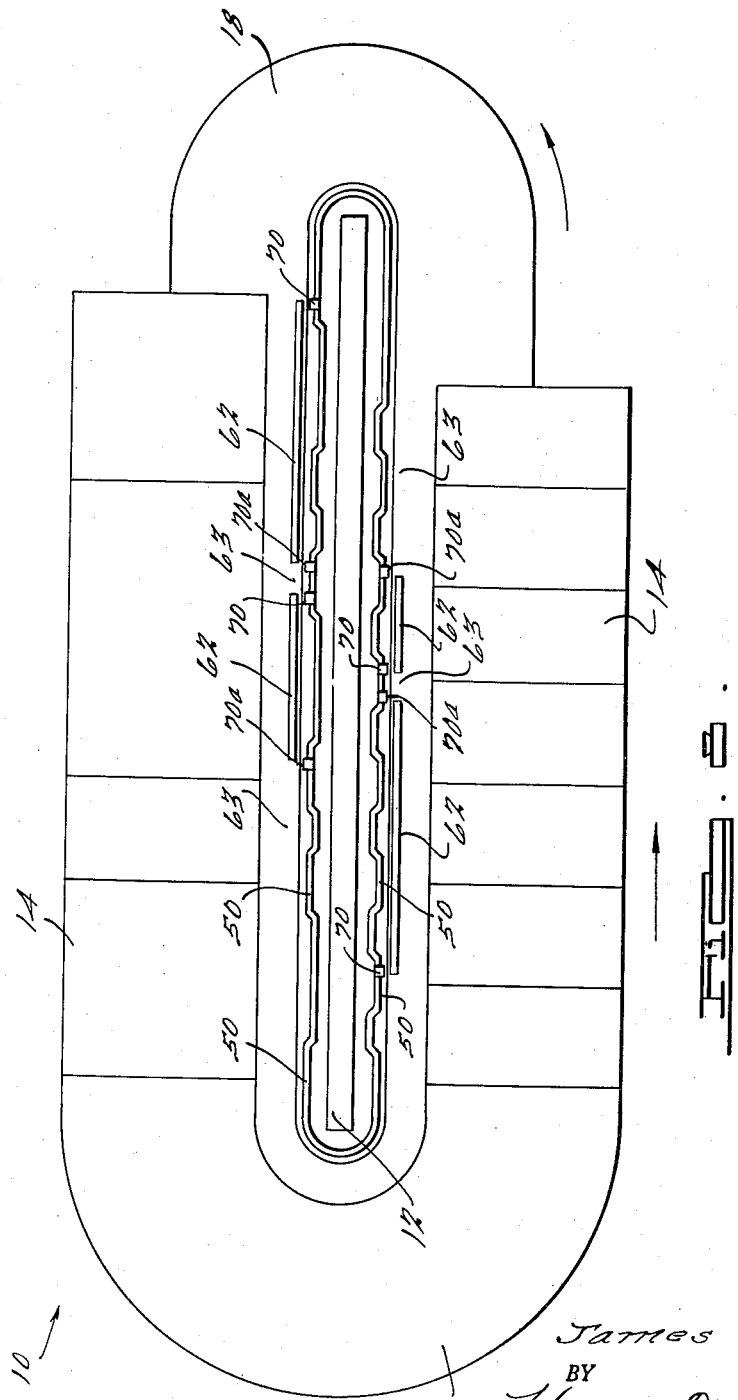

United States Patent Office 2,972,403
Patented Feb. 21, 1961

2,972,403
WORK HANDLING MACHINE WITH SKIP MECHANISM
James Barton, Grosse Pointe, Mich., assignor to Frederic B. Stevens, Inc., Detroit, Mich., a corporation of Michigan Filed May 15, 1959, Ser. No. 813,426
10 Claims. (Cl. 198—19)

This invention relates generally to electro-chemical treatment machines having a series of solution tanks through which the work is continuously and automatically directed and more particularly to a machine of this type having an automatic skip mechanism incorporated therein so that some work can skip some of the tanks.

In some electroplating and anodizing systems it is sometimes desirable to be able to have some work travel through the machine without being dipped in all of the solution tanks. It is also desirable to have a machine which is capable of performing as many different treatment cycles as possible, since such a machine is very flexible and is capable of performing work of many types. The object of the present invention, therefore, is to provide a machine of this type with an automatic skip mechanism, and wherein structure on each carrier can be set to determine which tanks will be skipped by the work on that carrier.

A further object of this invention is to provide a work handling machine which is simple in construction, economical to manufacture, and which can readily be converted to a plurality of different work cycles.

Further objects, features and advantages of this invention will become apparent from a consideration of the following description, the appended claims and the accompanying drawing in which:

Figure 1 is a fragmentary end view of a portion of the machine of this invention;

Fig. 2 is a fragmentary plan view as seen substantially along the line 2—2 in Fig. 1;

Fig. 3 is a fragmentary sectional view, looking substantially along the line 3—3 in Fig. 2, of a portion of the machine of this invention, showing a work carrier in a position in which work thereon is immersed in a tank;

Fig. 4 is a sectional view looking substantially along the line 4—4 in Fig. 3;

Fig. 5 is a fragmentary sectional view, similar to Fig. 3, looking substantially along the line 5—5 in Fig. 2, of a portion of the machine of this invention showing a work carrier in a position in which the work thereon is suspended above a tank;

Fig. 6 is a fragmentary sectional view looking substantially along the line 6—6 in Fig. 5 showing a lift pad member in the machine of this invention;

Fig. 7 is a view, illustrated similarly to Fig. 6, of a let down pad member in the machine of this invention; and Fig. 8 is a diagrammatic view of the machine of this invention illustrating the relation of the main frame, the solution tanks, the guide rail and the skip rail.

With reference to the drawing, the machine of this invention, indicated generally at 10, is illustrated in Figs. 1 and 8 as being of the general type shown in Hannon Patent 1,970,850, issued October 1, 1931. The machine 10 consists of a main frame 12 having rows of liquid treatment tanks 14 on opposite sides thereof, a turnaround treatment tank 16 at one end and a load and unload station 18 at the opposite end. An endless loop-shape track 20 (Figs. 2 and 3) on the main frame 12 is substantially concentric with and located within the loop defined by the tanks 14 and 16 and the load and unload station 18.

A plurality of work carrier assemblies, a pair of which are illustrated in Fig. 2 and designated generally by the numerals 22 and 24, are supported on the track 20 for continuous movement along the track so that work supported thereon travels through the tanks 14 and 16. Since the work carrier assemblies 22 and 24 are identical, only the assembly 22 will be described in detail, with like numerals indicating like parts on the two assemblies.

The work carrier assembly 22 comprises a body 26 (Figs. 3 and 5) provided with a suporting roller 28 which rolls in a trough 30 formed at the lower side of the track 20. The body 26 is connected, at a position above the roller 28, to an endless chain 32 which travels in an inverted trough 34 formed in the upper side of the track 20. A main supporting arm 36 is pivotally supported at its inner end on a horizontal shaft 38 carried by the body 26. At its outer end, the arm 36 carries a bracket 39 which supports a container 40 for the parts to be treated in the machine 10. A second arm 42 mounted at its inner end on the body 26 and connected at its outer end to the bracket 39 cooperates with the arm 36 to maintain the container 40 horizontal in both its lower and upper positions illustrated in Fig. 1.

A guide rail 44 (Figs. 2 and 3) is mounted on the frame 12 at a position below the track 20 and extends about the frame 12 in a generally parallel relation with the track 20. Each carrier arm 36 is provided with a guide roller 46 disposed so that it rides on the guide rail 44 which is formed with spaced hump portions 50 (Figs. 2 and 5) that extend transversely of the frame 12 in a direction outwardly thereof. In other words, each hump portion 50 extends transversely of the longitudinal path of travel of the work carrier assemblies and has what for convenience of description is described as an "up-hill" section 52 and a "down-hill" section 54.

During travel of a guide roller 46 along a hump portion 50 of the guide rail 44, it first moves along the "up-hill" section 52, and the carrier arm 36 is swung upwardly in a counterclockwise direction as viewed in Figs. 1 and 3 so as to lift the work container 40 carried on the outer end of the arm 36 upwardly. The arms 36 and the hump portions 50 are proportioned so that when a guide roller 46 has completed its travel on a section 52 of a hump portion 50, the corresponding arm 36 has been moved upwardly sufficiently to move the work container 40 above the level of the end walls 60 between adjacent tanks 14 or 16 as shown in Fig. 8. During travel of a roller 46 along a "down-hill" section 52 of a hump portion 50, the corresponding arm 36 is swung downwardly to return the container 40 thereon to a position within a tank. As shown in Fig. 2, the hump portions 50 are disposed with respect to the tanks so that each portion 50 is substantially bisected by a vertical plane through the adjacent end walls 60 of a pair of tanks. As a result, each hump portion 50 is effective to lift the container 40 out of one tank, over the adjacent tank end walls 60 and downwardly into the next tank.

This invention provides a skip rail or track 62 mounted on the frame 12 at a position above the endless track 20 and a skip roller 64 mounted on a supporting bracket 66 carried by the arm 36 for each carrier assembly. The skip roller 64 is disposed so that when the arm 36 is lifted high enough, and is moved longitudinally along the track 20, the skip roller 64 will be moved into rolling engagement with the skip track 62 as shown in Fig. 5. The track 62 is disposed so that when the skip roller 64 is in engagement therewith the track 62 prevents the arm 36 from swinging downwardly since it is in the path of movement of the roller 64 during lowering movement of the arm 36. Consequently, during travel of a roller 64 on the skip track 62, the corresponding guide roller 46 is spaced above the guide rail 44.

To lift the arm 36 upwardly a distance sufficient to locate the skip roller 64 in the position illustrated in Fig. 5, lift pad members 70 are provided which can be moved to positions overlying parts of the hump portions 50 for increasing the rise thereof to further increase the distance the arms 36 are swung upwardly during movement on the hump portions 50. Each of the lift pad members 70 is secured at its inner end 72 to one end of a support plate 74 which is pivotally supported intermediate its ends on a pin 76 carried by a stationary plate 78 which is secured to the hump portion 50 and constitutes a part of the main frame 12. At its opposite end, the plate 74 is pivotally connected to the terminal end of a piston rod 80 for a hydraulic cylinder assembly 82 that is pivotally supported on a shaft 84 carried by the main frame 12.

On extension of the piston rod 80, the plate 74 is rotated in a clockwise direction to locate the lift pad member 70 in a position resting on the corresponding hump portion 50 (Fig. 5). On retraction of the piston rod 80 (Fig. 3), the plate 74 is swung in a counterclockwise direction to lift the pad member 70 off the hump portion 50. A safety switch 86 has an actuating lever 88 that is engaged by the plate 74 when the pad member 70 has been fully lifted off the hump portion 50. The safety switch 86 is connected in circuit with the drive for the chain 32 so that the chain will not operate at certain times unless the switch 86 is closed. As shown in Fig. 6, a lift pad 70 is formed at one end with a curved inclined portion 71 to facilitate travel of the rollers 46 upwardly off the hump portion 50 onto the lift pad member 70.

The skip track 62 consists of spaced portions parallel to the track 20 and separated by gaps 63. When a skip roller 64 on an arm 36 has reached the end of a portion of the skip track 62, so that the arm 36 is to be lowered to a position in which the guide roller 46 is again supported on the guide rail 44, a let-down pad member 70a is provided for lowering the guide roller 46 onto the rail 44. As shown in Fig. 8, each portion of the skip track 62 ends at a location above a hump portion 50 and a let-down pad 70a is provided at each such location. Each pad 70a has a curved inclined end portion 71a down which the rollers 46 travel onto the guide rail 44. Each let-down pad member 70a is mounted exactly like the lift pad members 70 for back and forth movement relative to the guide rail 44.

It is seen, therefore, that during travel of the carriers 22 and 24 along an endless path about the frame 12, the guide rollers 46 travel on the rail 44 to rotate the arms 36 up and down about the pivots 38 to thereby move the containers 40 up and down across the tank end walls 60 and into the tank solutions. The pad members 70a and the skip track 62 are located so that when the work on a carrier 22 is to skip a tank or tanks, the lift pad member 70 for the hump portion 50 disposed adjacent the inlet end of the tank is moved to its position shown in Fig. 5. The guide roller 46 travels onto the lift pad 70 and the skip roller 64 is moved upwardly to a position in which it travels onto one end of the skip track 62 and is in the position shown in Fig. 5. During subsequent movement of the drive chain 32 to advance the carriers 22 and 24, the roller 64 travels on the track 62 which supports the arm 36 in a position in which the roller 46 is spaced above the guide rail 44. When the roller 64 reaches the gap 63 between adjacent portions of the track 62, the arm 36 is free to move downwardly to a position in which the roller 46 travels onto a let-down pad 70a and off the pad 70a onto the adjacent hump portion 50 for further travel on the guide rail 46.

Each carrier assembly 22 and 24 is provided with a switch actuator support 90 which carries a plurality of substantially horizontal switch actuators 92 (Figs. 3, 4 and 5) arranged in a side by side relation on the support 90. Each actuator 92 is pivotally mounted at one of its ends on a pin 94 carried by the support 90 so that it is movable between a position in which a projection 96 on one side thereof extends upwardly and a position in which the projection 96 extends downwardly. In the former position, the actuator 92 is in a switch actuating position while in the latter position it is in a non-operative position.

The projections 96 on the switch actuators 92 are engageable with the operating arms 98 for a plurality of switches 91 mounted on the frame 12 and corresponding in number to the number of pairs of cylinders 82 which actuated the pads 70 and 70a. The support 90 is illustrated in Fig. 5 as being provided with four switch actuators 92 to provide for a skipping of four tanks or series of tanks, as shown in Fig. 8, in accordance with the locations of the portions of the skip tracks 62. Since four separate lengths of skip track 62 are illustrated four switch actuators 92 are required, each one of which is engageable with a pair of switch arms 98 for a pair of pad members 70 and 70a corresponding to a length of skip track 62.

During travel of a carrier assembly along the track 20 and about the frame 12 (Fig. 8), if the actuator 92 for the switch 91 corresponding to the first pad member 70 is in an actuating position, the corresponding cylinder 82 is operated to position the pad member 70 on the hump portion 50 which is below the inlet end of the first portion of the skip track 62. The roller 46 for the carrier assembly then travels onto the pad 70 to guide the skip roller 64 onto the track 62. When the roller 64 travels off the first portion or length of the track 62 the pad 70a is in position to lower the roller 46 onto the rail 44 at a hump portion 50 because the actuator 92 has actuated a second switch 91 which controls movement of the pad 70a. If the next tank or tanks 14 are provided with a length of the skip track 62, and the switch actuator 92 corresponding thereto is in an actuating position, the pads 70 and 70a at opposite ends of the rail portion 62 are moved onto the rail 44 at the desired times and the carrier assembly is again moved upwardly to a position in which the roller 64 rides on the track 62.

If an actuator 92 corresponding to a portion of a skip track 62 is in its non-operative position, the pads 70 and 70a below the ends of the track portion remain in positions spaced from the rail 44. Consequently, the carrier assembly arm 36 is not lifted upwardly far enough to move the roller 64 onto the track 62 and the roller 46 follows the rail 44 so that the container 40 is moved into and out of the tanks 14 and 16.

The projection 96 on each switch actuator 92 is of a length to hold the arm 98 in a switch actuating position during travel of the roller 46 onto the pad 70 and off the pad 70 to a position in which the carrier assembly is supported by the skip track 62. When the projection 96 moves past the switch arm 98, the arm 98 is released so that the switch 91 moves to its non-actuated position and the cylinder 82 operates to move the pad 70 off the rail 44.

When the same projection 96 which actuated the arm 88 to provide for movement of the pad 70 approaches the end of the skip length of track 62 on which the carrier assembly has been riding, it actuates another switch arm 98 to provide for movement of a pad 70a onto the rail 44 for a sufficient time to lower the roller 46 back onto the rail 44.

From the above description, it is seen that this invention provides a work handling machine 10 which is operable so that any work carrier assembly 22 or 24 can skip a plurality of tanks. As many switch actuators 92 and skip track lengths can be provided as desired to enable the mechanism to skip more or less tanks. Each carrier assembly introduced into the machine has its switch actuators 92 set so that the work on that carrier will skip the desired tank or tanks. Of course, by moving all of the actuators 92 to positions in which their projections 96 extend downwardly, no tanks will be skipped.

It will be understood that the specific construction of the improved work handling machine which is herein disclosed and described is presented for purposes of explanation and illustration and is not intended to indicate limits of the invention, the scope of which is defined by the following claims.

What is claimed is:

1. In a work handling machine which includes a work carrier mounted for movement along a predetermined longitudinally extending path, rail means corresponding to selected portions of said path, actuatable means movable to a position in said path for engagement with said carrier to move the carrier transversely of said path to a preselected position, guide means on said carrier movable into engagement with said rail means in said preselected position of said carrier so as to maintain the carrier in said position during travel of said guide means on said rail means, and pre-set means on said carrier movable between positions for actuating and not actuating said actuatable means.

2. In a work handling machine which includes a main frame, a guide rail on said frame having hump portions which extend transversely thereof, and a plurality of work carriers having pivotally supported work carrier arms mounted on said frame for travel along said rail and for pivotal movement transversely of the rail during travel on said hump portions; the improvement which comprises an auxiliary rail mounted on said main frame above said guide rail, guide means mounted on said carriers for riding engagement with said auxiliary rail in a pivotally moved position of the carrier arms, means movable to positions on said hump portions for increasing the extent of pivotal movement of said carrier arms when said carriers are traveling on said hump portions, said auxiliary rail being located so that a carrier has its guide means engaged with said auxiliary rail for maintaining the carrier arm in its pivotally moved position during travel of said guide means on said auxiliary rail.

3. In a work handling machine which includes a row of side by side tanks, a main frame, a guide rail on said main frame, a plurality of work carriers mounted on said main frame for guided travel on said rail, said rail having longitudinally spaced hump portions located so that during travel of a carrier thereon it is moved upwardly over a tank wall and downwardly into an adjacent tank; the improvement which comprises providing pad members movably mounted on said main frame for movement to and from positions on said hump portions, each pad member being shaped so that a carrier traveling thereon is moved upwardly an increased distance relative to the distance it is moved upwardly when traveling on said hump portion without the pad member thereon, and coacting means on said main frame and carriers for maintaining a carrier in an upwardly moved position for a predetermined portion of its travel after travel off said pad member.

4. In a work handling machine which includes a guide rail, and a plurality of work carriers mounted for guided travel on said guide rail; the improvement which comprises providing pad members for movement to and from positions on said guide rail, each pad member being shaped so that a carrier traveling thereon is moved transversely of and off said guide rail, and means for maintaining a carrier in transversely moved position for a predetermined portion of its travel after travel off said pad member.

5. In a work handling machine which includes a row of side by side tanks, a main frame, a guide rail on said main frame, a plurality of work carriers mounted on said main frame for guided travel on said rail, said rail having longitudinally spaced hump portions located so that during travel of a carrier thereon it is moved upwardly over a tank wall and downwardly into an adjacent tank; the improvement which comprises providing pad members movably mounted on said main frame for movement to and from positions on said hump portions, each pad member being shaped so that a carrier traveling thereon is moved upwardly an increased distance relative to the distance it is moved upwardly when traveling on said hump portion without the pad member thereon, coacting means on said main frame and carriers for maintaining a carrier in an upwardly moved position for a predetermined portion of its travel after travel off said pad member, means on said frame for moving each pad member between a position spaced from a corresponding hump portion and a position on said hump portion, actuatable means for moving each pad member, and pre-settable means on each carrier for actuating said actuatable means to move each pad member prior to travel of the carrier on the hump portion onto which said pad member is movable.

6. In a work handling machine which includes a row of side by side tanks, a main frame, a guide rail on said main frame, a plurality of work carriers mounted on said main frame for guided travel on said rail, said rail having longitudinally spaced hump portions located so that during travel of a carrier thereon it is moved upwardly over a tank wall and downwardly into an adjacent tank; the improvement which comprises providing pad members movably mounted on said main frame for movement to and from positions on said hump portions, each pad member being shaped so that a carrier traveling thereon is moved upwardly an increased distance relative to the distance it is moved upwardly when traveling on said hump portion without the pad member thereon, coacting skip track and roller means on said main frame and carriers for maintaining a carrier in an upwardly moved position and for a predetermined portion of its travel after travel off said pad member, means on said frame for moving each pad member between a position spaced from a corresponding hump portion and a position on said hump portion, actuatable means for moving each pad member, and pre-settable means on each carrier for actuating said actuatable means to move each pad member prior to travel of the carrier on the hump portion onto which said pad member is movable.

7. In a work handling machine which includes a row of side by side tanks, a main frame, a guide rail on said main frame, a plurality of work carriers mounted on said main frame for guided travel on said rail, said rail having longitudinally spaced hump portions located so that during travel of a carrier thereon the work on the carrier is moved upwardly over a tank wall and downwardly into an adjacent tank; the improvement which comprises providing pad members movably mounted on said main frame for movement to and from positions on said hump portions, each pad member being shaped so that a carrier traveling thereon is moved upwardly an increased distance relative to the distance it is moved upwardly when traveling on said hump portion without the pad member thereon, and coacting skip rail means on said main frame and skip rollers on said carriers for maintaining a carrier in an upwardly moved position for a predetermined portion of its travel after travel off said pad member, said skip rail means being of a length to extend between a pair of hump portions so that a carrier having its skip roller engaged with said skip rail means has the work thereon held out of the tanks between said pair of hump portions.

8. In a work handling machine which includes a row of side by side tanks, a main frame, a guide rail on said main frame, a plurality of work carriers mounted on said main frame for guided travel on said rail, said rail having longitudinally spaced hump portions located so that during travel of a carrier thereon the work on the carrier is moved upwardly over a tank wall and downwardly into an adjacent tank; the improvement which comprises providing lift pad members movably mounted on said main frame for movement to and from positions on said hump portions, each lift pad member being shaped so that a carrier traveling thereon is moved upwardly an increased distance relative to the distance it is moved upwardly when traveling on said hump portion without the lift pad member thereon, coacting skip rail means on said main frame and skip rollers on said carriers for maintaining a carrier in an upwardly moved position for a predetermined portion of its travel after travel off said lift pad member, said skip rail means being of a length to extend between a pair of hump portions so that a carrier having its skip roller engaged with said skip rail means has the work thereon held out of the tanks between said pair of hump portions, and a let-down pad member movable onto said guide rail at a position such that when a carrier moves out of a position supported on said skip rail means the carrier returns on said let-down pad member to a position on said guide rail.

9. In a work handling machine which includes a main frame, a guide rail on said frame having hump portions which extend transversely thereof, and a plurality of work carriers having pivotally supported arms mounted on said frame for travel along said rail and for pivotal movement of said arms transversely of the rail during travel on said hump portions; the improvement which comprises an auxiliary rail mounted on said main frame above said guide rail, a roller mounted on each carrier for riding engagement with said auxiliary rail in a pivotally moved position of the carrier arm, pad members mounted on said frame for selective movement to positions on said hump portions for increasing the extent of pivotal movement of said carrier arms when said carriers are traveling on a pad member, said auxiliary rail means being located so that a carrier roller is riding thereon when said carrier arm has been moved upwardly by travel of the carrier on a pad member, and pre-settable means on each carrier for controlling the movement of each pad member prior to engagement therewith by said carrier.

10. In a work handling machine which includes a main frame, a guide rail on said main frame, a plurality of work carriers mounted for guided travel on said rail along a longitudinally extending path, said rail having longitudinally spaced hump portions located so that during travel of a carrier thereon it is moved transversely of said path; the improvement which comprises providing pad members mounted for movement to and from positions on said hump portions, each pad member being shaped so that a carrier traveling thereon is moved transversely of said path an increased distance relative to the distance it is moved when traveling on said hump portion without the pad member thereon, and coacting means on said main frame and carriers for maintaining a carrier in an upwardly moved position for a predetermined portion of its travel along said path after travel off said pad member.

References Cited in the file of this patent

UNITED STATES PATENTS

| | | |
|---|---|---|
| 2,061,165 | Miller | Nov. 17, 1936 |
| 2,214,262 | Todd | Sept. 10, 1940 |
| 2,341,606 | Finston | Feb. 15, 1944 |
| 2,512,643 | Hannon | June 27, 1950 |